United States Patent [19]

Leonard

[11] 4,439,785
[45] Mar. 27, 1984

[54] SUBSCRIBER TELEVISION SYSTEM

[75] Inventor: Eugene Leonard, Port Washington, N.Y.

[73] Assignee: VVR Associates, Roslyn, N.Y.

[21] Appl. No.: 207,125

[22] Filed: Nov. 17, 1980

[51] Int. Cl.³ .............................................. H04N 7/16
[52] U.S. Cl. .................... 358/120; 358/122; 358/335; 358/146; 360/27; 360/33.1; 360/37.1
[58] Field of Search ............................ 360/37, 33, 27; 358/127, 122, 120, 146

[56] References Cited

U.S. PATENT DOCUMENTS

| | | | |
|---|---|---|---|
| 3,313,880 | 4/1967 | Bass | 358/120 |
| 3,485,941 | 12/1969 | Bass | 358/120 |
| 3,969,581 | 7/1976 | Watatani et al. | 358/127 |
| 4,028,733 | 6/1977 | Ulicki | 360/33 |
| 4,097,893 | 6/1978 | Camras | 360/33 |
| 4,122,477 | 10/1978 | Gallo | 360/37 |
| 4,159,480 | 6/1979 | Tachi | 358/127 |
| 4,185,305 | 1/1980 | Perret et al. | 358/114 |
| 4,295,155 | 10/1981 | Jarger et al. | 358/120 |
| 4,305,101 | 12/1981 | Yarbrough et al. | 360/69 |
| 4,319,273 | 3/1982 | Nossem | 358/120 |

Primary Examiner—S. C. Buczinski
Attorney, Agent, or Firm—Hane, Roberts, Spiecens & Cohen

[57] ABSTRACT

A video recorder has a first transducer which moves with respect to a moving tape to selectively record and play back video information; the tape has a control region which is accessed for recording or playback by a second transducer. Storing means external of the tape store first coded indicia. Generating means responsive to the storing means is connected to the second transducer for generating second coded indicia to be recorded in the control region simultaneously with the recording of video information by the first transducer, provided the second coded indicia has a predetermined relationship with the stored first coded indicia. During playback signals recorded on the control region are utilized for synchronizing the relative movement between the first transducer and the second transducer and the tape.

10 Claims, 10 Drawing Figures

SUPERVISORY UNIT-SU

VIDEO TAPE RECORDER - VTR

CONTROL TRACK WRITE INTERFACE
CTWI

CONTROL TRACK READ INTERFACE – CTRI

SUBSCRIBER TELEVISION SYSTEM

BACKGROUND OF THE INVENTION

This invention pertains to subscriber television systems and, more particularly, to those systems wherein the subscriber terminals include video recorders.

There have been proposed subscriber television systems wherein a central station is connected to a plurality of subscriber terminals by means of a closed circuit multi-channel link, for example, a multi-channel television cable system. In such systems, the viewer is given a menu of programs to select for viewing and the viewer pays a charge usually on a per month basis. While these systems are operating successfully, they do not handle the problem of unauthorized duplication of the material. In particular, with the advent of video cassette records and video disc systems, this unauthorized duplication can become a very simple process. Therefore, the system operator must resign himself to the fact that if he shows a prime entertainment program he suffers the grave risk of a duplication followed by the selling of pirated cassettes.

It is, accordingly, an object of the invention to provide apparatus which controls the playback of information from a video recorder so that if the playback is unauthorized the displayed information is unintelligible.

SUMMARY OF THE INVENTION

Briefly, the invention contemplates a video recorder having a first transducer which moves with respect to a moving record medium to selectively record and play back video information. The record medium has a control region which is also accessed for recording and playback by a second transducer. In addition, the recorder includes synchronizing circuits which respond to synchronizing signals to synchronize the relative movement between the record medium and the first transducer. Such a combination is presently available today, for example, in a video tape recorder wherein the first transducer is a rotating magnetic head and the second transducer is a fixed magnetic head which is positioned opposite an edge of the longitudinally moving tape.

In the present invention in order to insure the synchronization there is provided storing means for storing first coded indicia and generating means connected to the second transducer for generating second coded indicia which are recorded in the control region simultaneously with the recording of the video information by the first transducer. The synchronizing signals are generated by means connected to the synchronizing circuit so that the synchronizing signals are generated during the playback of information by the first transducer only when the second coded indicia played back by the second transducer has a predetermined relationship with the first coded indicia. If the synchronizing signals are not generated the relative movement between the first transducer and the second transducer are completely unsynchronized with respect to the played video information and any display of this information will not result in properly displayed information.

According to another aspect of the invention, it may be desirable to allow a designated subscriber to record a desired single frame of a television signal in the signal stream broadcast by the head end of a cable system to all receivers in the system, these receivers each being assigned an address and having a video cassette recorder. In such case, the head end when transmitting the television signals inserts the address of the designated subscriber just before the desired single frame. When the receiver of the designated subscriber senses the address it switches its video cassette recorder to the record mode, actually recording all signals but switching to play back after the designated frame is completed. At the end of the frame, when the frame pulse is detected, the video cassette recorder is switched from the record to the playback mode. Such a concept is useful in home mail order shopping.

BRIEF DESCRIPTION OF THE DRAWING

Other objects, the features and advantages of the invention will be apparent from the following detailed description when read with the accompanying drawing which shows the presently contemplated embodiment of the invention. In the drawing.

DETAILED DESCRIPTION OF THE PREFERRED EMBODIMENTS OF THE INVENTION

Figure 1:
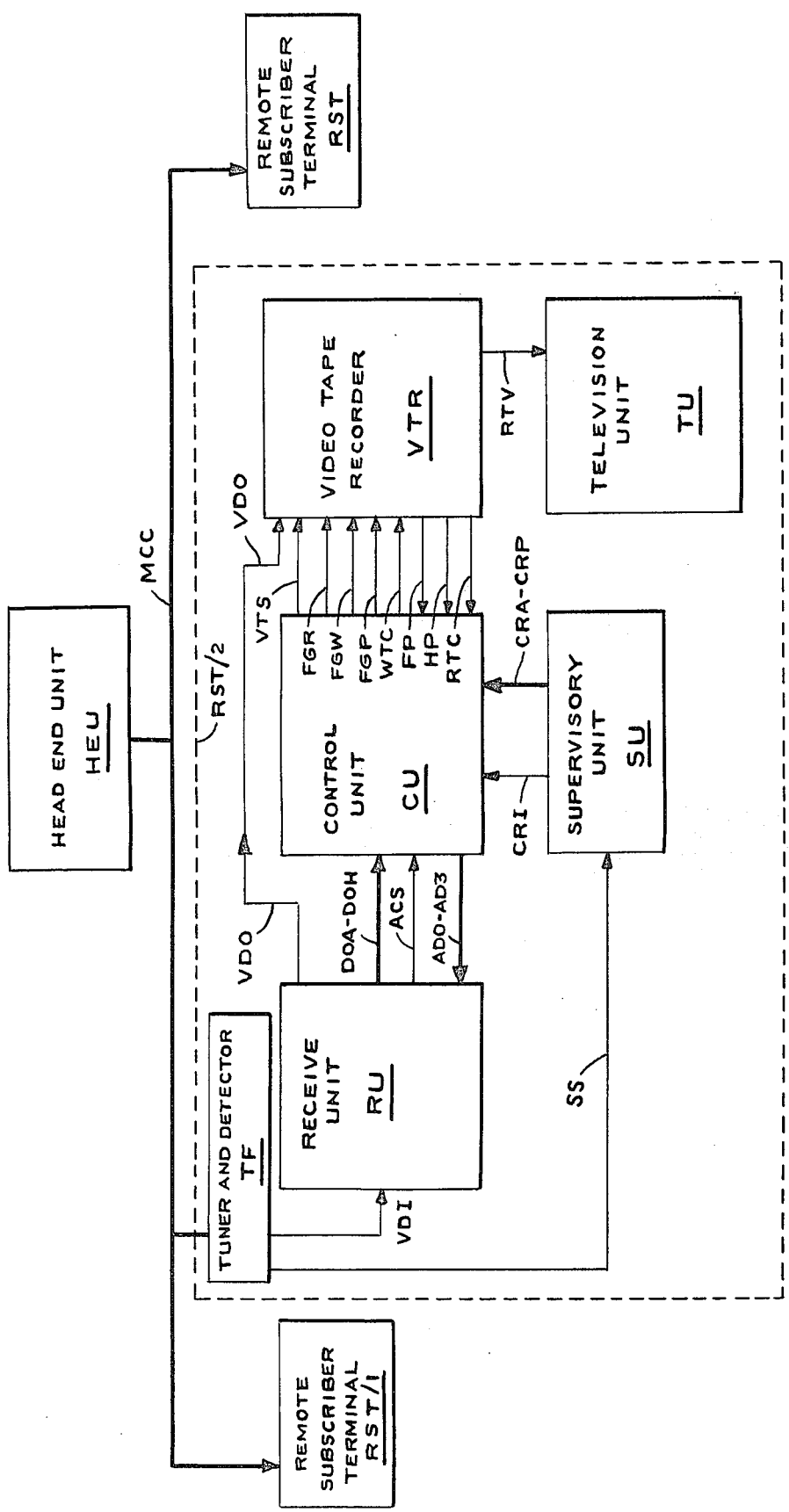
FIG. 1 is a block diagram of a closed-circuit television system utilizing the invention.

In FIG. 1 there is shown the block diagram of a simplified subscriber television system STS which incorporates the invention. The system includes the head end unit HEU coupled via a multi-channel television cable MCC to a plurality of remote subscriber (or video) terminals RST/N.

The head end unit HEU can be a source of television programming material, digital information for conversion into characters and also still material such as catalog pages for mail order shopping.

Figure 2:
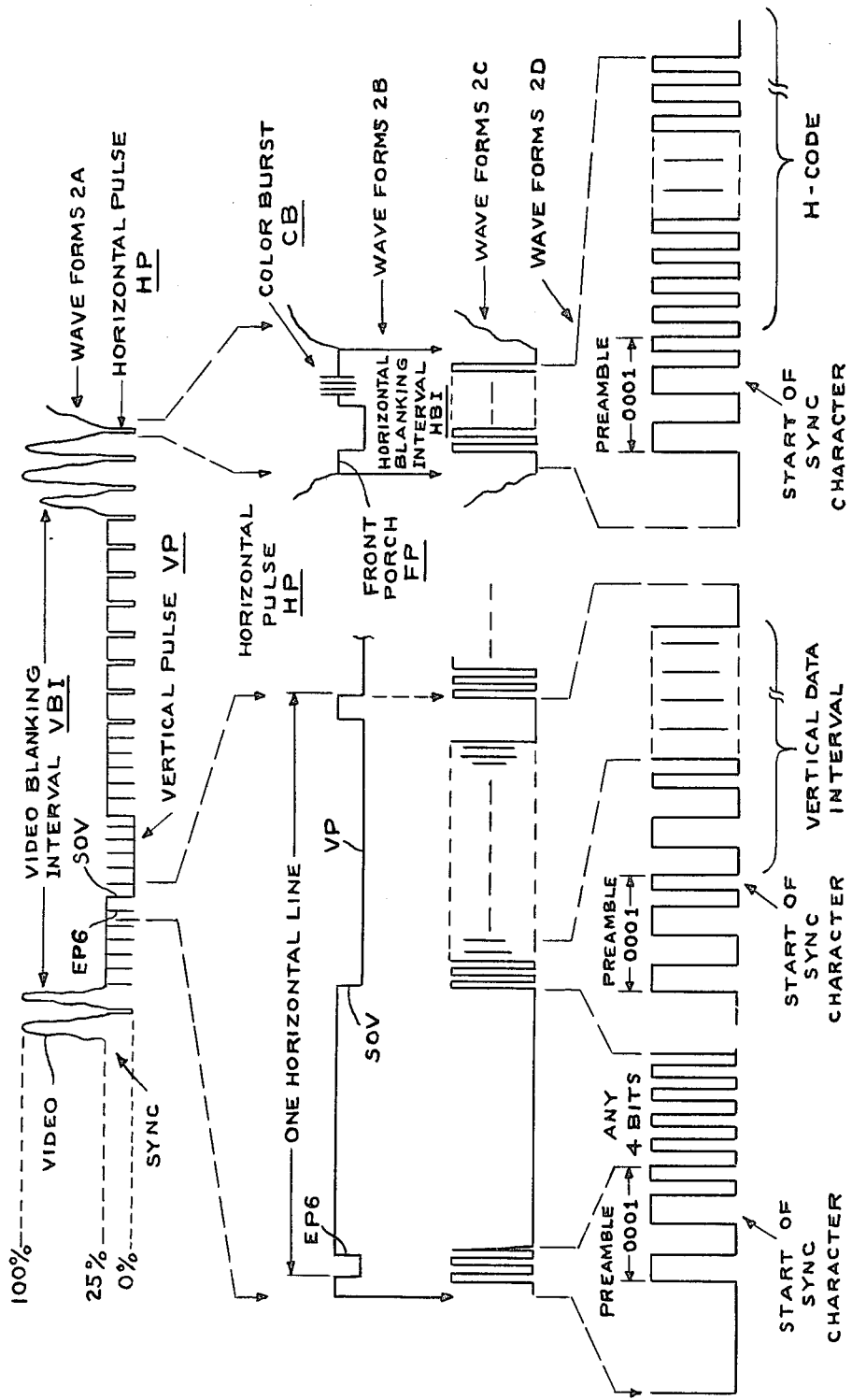
FIG. 2 is a waveform diagram useful in explaining the operation of the system of FIG. 1.

In FIG. 2 there is shown the waveforms of the television signals transmitted from the head end unit HEU to the remote subscriber terminals RST/1 to RST/N. In particular, waveform 2A shows the region around a conventional vertical blanking interval surrounded by the end of the video signal for one field and the start of the video signal for the next field. As also can be seen in waveform 2A, the synchronizing signals extend from the zero level to a level which is 25% of full amplitude, and the video signals extend from the 25% level upward to 100%. As is well known in the television transmission art, the synchronizing pulses are generally of four types: horizontal synchronizing pulses which establish each of the horizontal lines of the television raster; vertical synchronizing pulses which establish the fields of the television raster, equalizing pulses which are used to accomodate the fact that the two fields which constitute the complete TV frame are (in NTSC) 262½ lines each; and color burst signals which are used to establish synchronization of the color burst oscillator in a conventional receiver (the color burst signals are not shown in waveform 2A because they are not transmitted during Vsync and are too short to perceive on the scale shown). Waveform 2B actually shows the conventional synchronizing pulses used in television transmission. For instance, there is shown that last equalizing pulse EP6 before the start of the first vertical synchronizing pulse. Following in time the equalizing pulse EP6, is the start of the first vertical pulse VP whose leading edge is indicated as reference numeral SOV (compare with waveform 2A). The time span shown between equalizing pulse EP6 and vertical pulse VP is equal to one half of a horizontal line. The right hand portion of the waveform 2B shows a horizontal blanking interval which actually includes a front porch FP, the horizontal synchronizing pulse per se and the color burst CB.

The waveform 2C is in the same time scale as the waveform 2B and actually shows how the conventional equalizing pulses, the conventional vertical synchronizing pulses, and the conventional horizontal synchronizing pulses are modified according to the invention. The modifications are best seen by viewing the waveforms 2D which are magnifications of the waveforms 2C. According to the invention, each one of the synchronizing pulses, i.e., the equalizing pulses, the vertical synchronizing pulses and the horizontal pulses, are always indicated by a preamble. By way of example, this preamble has been chosen to be the binary number 0001 in biphase coding. In other words, whenever this preamble follows a black level or front porch of a requisite time it is known that completion of the preamble indicates the start of one of the synchronizing pulses. There may follow other data in biphase code. The equalizer pulses are represented by preambles followed by only four more bits.

The vertical sync character format is basically a repeat of the preamble, i.e., the binary number 0001 again represented in biphase coding. Following the preamble there is at least one four bit character in biphase and eight or more bytes of biphase coding which represents vertical interval data whose function will hereafter become apparent.

A horizontal synchronizing pulse is represented by a preamble followed by the horizontal sync word in biphase. Following the horizontal sync preamble is a combination of 12 bits of data. As will hereinafter become apparent, the data portion of the horizontal sync interval includes a code which identifies the program being transmitted, the so-called H-code.

The generation of these specialized pulses is well known and will not be described in detail. For example, the head end unit HEU can include a circuit which when it senses the equalizing pulse causes a character generator to generate the biphase coded binary number 0001, and similarly for the other synchronizing signals as well as the H-codes.

In addition, the head end unit HEU transmits on a separate channel of the cable MCC a supervisory signal the so-called E-code for the particular terminal and the P-code. The P-and E-codes are prefaced by the address of the particular terminal which is to receive information. The ability to control and report on viewer activity lies in the use of the interactions of the H-code, the P-code and the E-code. The P-code is transmitted to the individual subscriber terminal prior to the transmission of the desired video information. The E-code is transmitted less frequently, say once a month, to indicate the subscriber is in good standing financially. The H-code is transmitted every line in the television signal and is unique to the program being transmitted.

The multi-channel cable MCC is a conventional cable television cable having sufficient bandwidth for the various television channels available to the subscribers. In addition, a portion of the bandwidth, approximately 500 KhZ is reserved for a supervisory channel upon which is fed addressed information for all the subscribers.

A typical remote subscriber terminal RST includes: a tuner and detector TF, the tuner selecting the desired television channel for transmission of the television signals on line VDI and the supervisory signals on line SS; a receive unit RU for receiving television signals on the line VDI from the tuner and for transmitting television signals on line VDO, digital data on lines DOA to DOH, and activity indicating signals on line ACS; a supervisory unit SU which receives the addressed E- and the P-codes in biphase binary form on the line SS from the detector TF and after decoding feeds these codes in binary form onto cable CRA-CRP along with an interrupt signal of line CRI; a control unit CU which receives the signals on cable DOA-DOH representing the H-code from receive unit RU in response to address signals on cables ADO to AD3 which were generated by the receipt of a signal on line ACS, and which receives the P-codes and E-code on cable CRA-CRP from supervisory unit SU in response to an interrupt signal of line CRI. The control unit CU emits control signals of lines FGR, FGW, FGP, WTC and VTS for controlling a video tape recorder and receives signals on lines FP, HP and RTC concerning synchronization of the recorder; a video tape recorder VTR which receives the control signals of lines FGR, FGW and FGP for selecting playback, record and pause modes respectively, synchronizing signals on lines VTS for controlling the synchronization of playback, plus the signal on line VDO which is now a standard video signal and signals of line WTC for recording on the control track of the video tape, and emits signals on line RTC from the control track and signals on lines FP and HP concerning television synchronizing signals; and a television unit TU which can be a conventional television apparatus which receives television signals on line RTV.

Generally, the cable television system operates by the head end unit HEU making available to each remote subscriber terminal RST a menu of programs. The subscriber terminal can select any of the programs it wishes to view. Normally, the selected programs are transmitted in off-hours and loaded onto the video tape recorder of a remote subscriber terminal. Since the present invention is not concerned with the selection of the programs, this portion of the system will not be described. It will be assumed that the programs have been selected and a channel selector has been operated to record the first of the desired programs. Prior to the start of this particular transmission, the head end unit HEU sends via the supervisory channel to each of the remote subscriber terminals RSTN which are to receive the program the address of the particular subscriber terminal and following this address is the unique P-code. Also previously there was emitted on line SS the address of subscriber terminal RST followed by an E-code indicate whether the subscriber can receive the television information. The criteria for transmitting the E-code could very well be that the subscriber is current with payments of his billing. (Normally this information is sent on a monthly basis). It may not be necessary to transmit the E-code over the supervisory channel since it is also possible for the subscriber at the beginning of each billing period upon paying the previous bill to receive a coded record medium for insertion into the unit to establish the code or he could very well be given a code number which is keyed into the terminal. In any event, the E- and the P-codes enter the supervisory unit SU. It will be recalled that the digital signals were transmitted in biphase; therefore, the supervisory unit SU converts this biphase coding into straight binary pulse coding. It then decodes the address and if it is the address of the terminal, it transmits the such E- or P-code via lines of cable CRA-CRP along with an interrupt signal or line CRI to control unit CC.

The control unit CU then sends signals on line FGW to the video tape recorder VTR to energize it for recording. As the television information enters the receiving unit RU from the line VDI, the equalizing, horizontal and vertical synchronizing pulses are decoded from the biphase signals to the actual conventional pulse signals. As a result of this decoding and further processing, the receive unit RU transmits via line VDO to the video tape recorder VTR the video signals with conventional equalizing, horizontal synchronizing and vertical synchronizing pulses.

It will be recalled that within the horizontal blanking interval and following the actual horizontal synchronizing signal, there was embedded the H-Codes (See FIG. 2). Thus, as the horizontal synchronizing pulses are received by the receive unit RU, the H-codes are stripped therefrom and fed via the cables DOA to DOH to the control unit CU. The control unit CU in conjunction with frame pulses on line FP and horizontal sync pulses on line HP from the recorder VTR as well as the P-codes and E-codes converts the H-codes and P-codes to biphase representations which are fed therefrom via the line WTC to the longitudinal control track of the video tape recorder VTR. The recording of the television signals is performed in this manner. Generally, at the end of the recording the control unit CU can send a signal to the video tape recorder VTR to rewind the tape. (In fact, the control unit CU can send a programmed set of signals back to the video tape recorder VTR to insure that there is no possible manipulations by the operator to hide the fact a recording has been made. This would involve basically the interlocking of the eject mechanism of the tape recorder.) However, since these routines do not concern the present invention, they will not be discussed. Therefore, it can be assumed for the sake of simplicity that after the recording is done and at some time thereafter the operator pushes the rewind button on the tape recorder to rewind the tape to the start before a playback.

It is possible and highly likely that any playback would be under the control of the control unit CU of the remote subscriber terminal RST. For instance, the operator may push a button on the control unit calling for a playback and as the playback is performed, the control unit may record the fact that a playback is being made to accumulate information for billing the client for the playback. However, since these manipulations do not concern the present invention, they will be no further discussed. Therefore, it will be assumed that in order to perform a playback the operator merely pushes the conventional playback button of the video tape recorder VTR and the playback operation begins.

Before describing the playback operation, it will be fruitful to momentarily digress to a discussion of the operation of the video tape recorder VTR. In general, a conventional video tape recorder uses a rotating head which moves across a longitudinally moving tape in a relative slant fashion. The rotating head reproduces the television signals previously recorded by this head. Along one edge of the tape, there is what is known as a control track. Upon this control track are normally recorded pulses at a one per frame rate which during playback are read and operated on with the vertical synchronizing pulses in the television signals read by the rotating head. These two sets of pulses are then processed to drive a synchronizing circuit which, in turn, drives the rotating head's motor and the tape to insure that the head rotates at the proper speed and phase so that each line of transversely recorded video signal is picked up at the proper time. The synchronizing circuits also control the speed of the tape itself. In other words, the speed of the rotating head and tape are controlled so that the head enters the tape just as a previously recorded transverse line becomes available. If this synchronizing were not present, the tape and the head would phase vary with respect to each other and the lines read by the rotating head would not necessarily be properly aligned up with respect to the raster generated by the video synchronizing pulses.

With this in mind, it should be noted that on the control track during the recording operation, there had been recorded the H-codes and the P-codes. Therefore, during a playback operation as the video tape recorder VTR moves the tape, the television signals are read via the line RTV to the television unit TU for display. At the same time, there is read from the control track of the video tape recorder VTR via the line RTC to the control unit CU the words representing the P- and H-codes. In the control unit CU, there is performed a test with the E-code stored therein to determine a particular relationship. This relationship can take many forms. If the relationship exists between these three codes, there is returned to the video tape recorder via the line RTS the synchronizing pulse signal which is then used by the synchronizing circuits to control the speed of the rotating head and the tape. If the relationship does not exist, then the synchronizing signals are not fed back to the video tape recorder and there will be drift between the tape movement and the rotating head movement, resulting in improperly displayed lines of television information.

Figure 3:
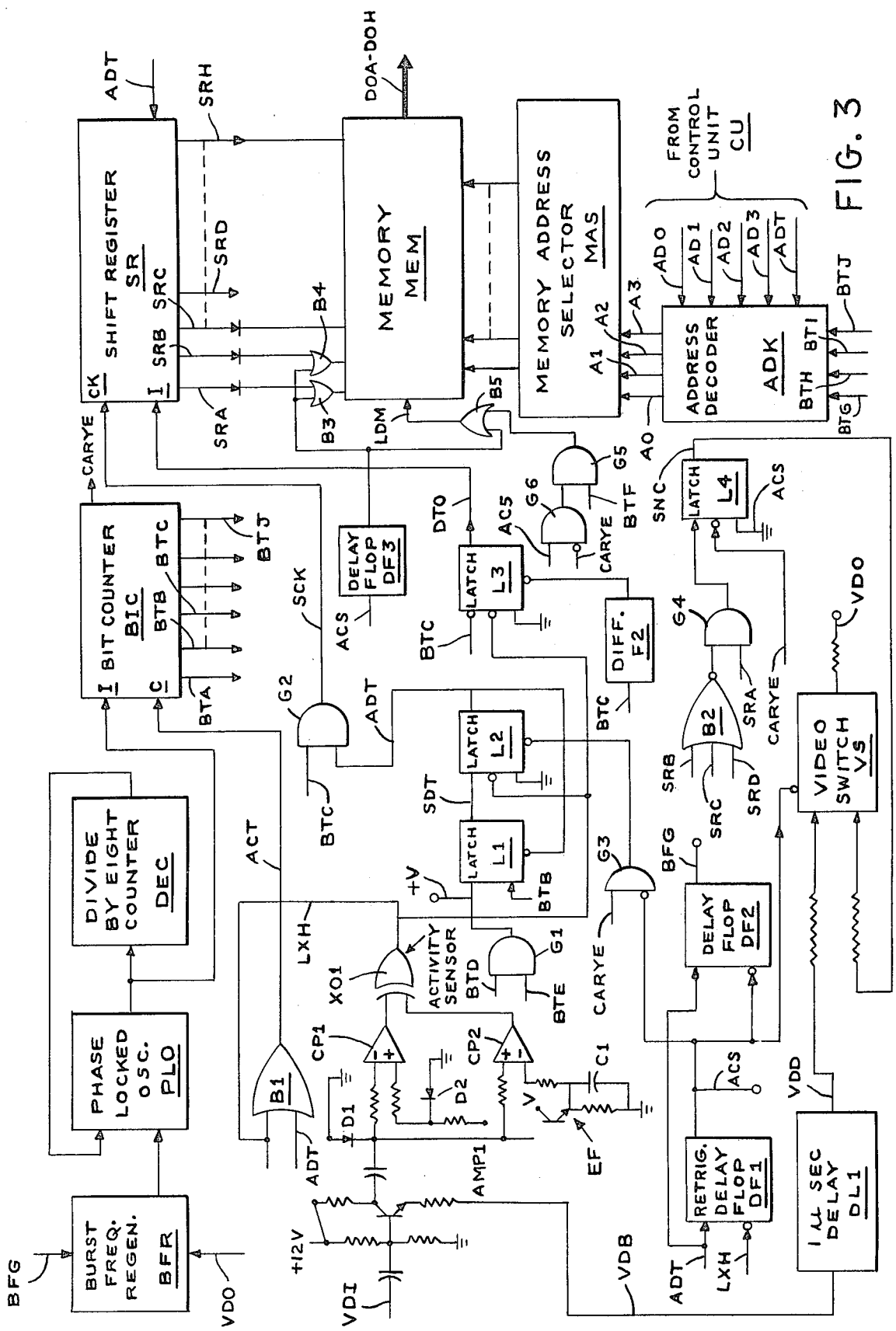
FIG. 3 is a logic diagram of the receive unit of one of the remote subscriber terminals of FIG. 1.

There will now be discussed in detail the various units making up the remote subscriber terminal RST. In FIG. 3, there is shown a logic diagram of the receive unit RU. As was described above, the function of the receive unit RU is to receive the television signals from the selected program channel of cable MCC and record these television signals in conventional manner onto the video tape recorder VTR. In addition to this function, the receive unit also extracts information stored in the H areas and the V areas of the television signal for transfer to the control unit CU. For the present, we will only consider the extraction of the H-codes from the horizontal blanking region of the conventional television signal. In generating the television signals, it is necessary for the receive unit to convert the biphase and binary coded synchronizing signals such as the equalizing signals, the horizontal synchronizing signals and the vertical synchronizing signals to the conventional television standard synchronizing signals.

The receive unit RU containing its own clock which centers around the phase locked oscillator PLO. According to conventional television standards, the color burst signal in the television signal operates at a frequency of 3.58 MHz. With this in mind, the phase locked oscillator has an operating frequency in the order of 8 times that value. The phase locked oscillator PLO thus generates a signal having a frequency of 28.64 MHz. This signal is fed to a divide-by-eight counter DEC whose output is fed to a first input of the oscillator PLO. The second input of the oscillator PLO receives the regenerated color subcarrier frequency which is locked to the burst frequency signal on the line VDO under the control of a signal BFG which, as will hereinafter become apparent, is only present during the time that the color burst is present in the television signal. In other words, the signal on line BFG allows the color sub carrier frequency regenerator BFR to refer to the incoming burst frequency during the period of time when the burst signal is present on the line VDO. This is standard in all color TV receivers. The details of the phase locked oscillator PLO will not be given since these techniques are well known in the art and can be embodied in an integrated circuit such as type XR215.

The output of the phase locked oscillator PLO is fed to the I-input of the bit counter BIC which is controlled by the OR-circuit B1. In particular, this counter will not count pulses from the oscillator PLO unless the OR-circuit B1 transmits a "high" signal to the C-input of the counter, as will hereinafter become apparent. The remainder of the circuitry of the receive unit will be described with the aid of FIG. 4.

Figure 4:
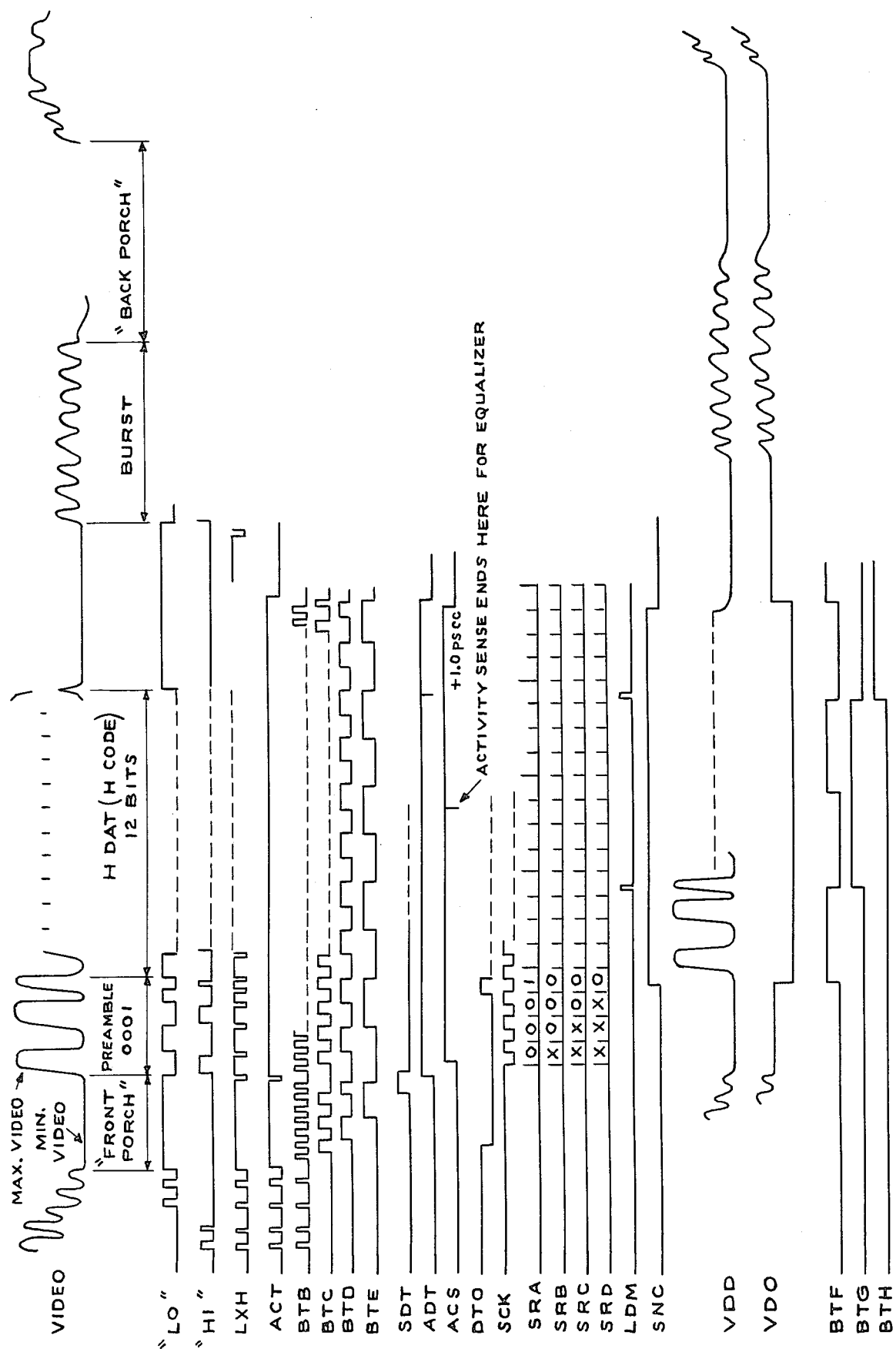
FIG. 4 is a waveform diagram useful in understanding the operation of the receive unit.

In FIG. 4 there are shown waveforms to help explain the operation of the receive unit RU. The television modified as per this invention signal which includes the video and the synchronizing signals is shown as waveform Video in FIG. 4. Just prior to the occurrence of one of the synchronizing signals, the video falls off to a minimum value command, known in the art as the front porch. The occurrence of the front porch indicates that the next signals coming in will be associated with the synchronization. Thus, it is necessary to look for this front porch. The test for the front porch is accomplished by counting. In particular, the television signal is received from line VDI by the amplifier AMP1. The nature of this amplifier is such that it amplifies the incoming signal approximately 5 times and as can be seen, the diode D1 provides a DC restoration level of about −0.7v for the output signal. Therefore, the video signal is clamped to a minimum video level as shown in FIG. 4. The output of the amplifier AMP1 is connected to inputs of two integrated circuit comparators CP1 and CP2 which can be of the type LM360. The positive input of the comparator CP1 is effectively connected to a reference voltage of a fraction of a volt below ground due to the clamping action of the diode D2. Therefore, wherever the input signal to the negative input goes below this reference level the comparator CP1 will go high. The output of the amplifier is connected to both the positive input of the comparator CP2 and the input of the emitter follower EF whose output is connected to the negative input of comparator CP2 and which maintains a charge on capacitor C1 which is slightly lower than the peak input signal. Thus, the comparator CP2 will emit a positive signal only when the incoming signal rises above a level which is a fraction of a volt below the maximum video level. The output of the comparator CP1 is the signal on line LO shown in FIG. 4 while the output of the comparator CP2 is the signal on line HI.

The outputs of the comparators CP1 and CP2 are fed to the exclusive OR-circuit XO1. Although it may be advantageous to use an exclusive OR-circuit, it should be noted that a conventional OR-circuit could equally well be used. The signal on line LXH is fed to one input of the OR-circuit B1 and the negative excursions of this signal continuously clear whatever count is in the bit counter BIC. During normal black periods with no color present, the television signal is not at minimum video level since the black level is always somewhat more positive than the most negative excursions of the video signals. Thus, the normally so-called front porch will be a black level. However, in this case, it is caused to be at the minimum video signal level and during that time there are no pulses emitted from the OR-circuit B1 to clear the counter so that the counter does continue counting. When a particular count is reached, the combination of the signals on lines BTD and BTE at AND-circuit G1 allow the latch L1 to be set by the signal on line BTB causing the generation of a signal on line SDT. The signal on line SDT in turn primes the latch L2 so that the next pulse on the LXH line will set the latch L2 causing the generation of a signal on line ADT. The signal on line ADT is fed to the second input of the OR-circuit B1 which now holds the bit counter BIC in the counting mode irrespective of the signal on line LXH. The signal on line ADT also resets the latch L1.

At this point in time, the receive unit RU is in a position now to actually receive the biphase coded data. The coding is Ferranti-Manchester coding which is a self-clocking system used in many magnetic recording operations. In the present case, when the bit counter is emitting a signal on line BTC, transitions representing the beginning and the end of a biphase bit cell may be detected. When the signal on line BTC is low, transitions occurring in the middle of the bit cell may be detected. Now, with this particular biphase coding, it is the transitions in the middle of the bit cell which determine whether the bit is a "0" or a "1". The detection of data is performed by the latch L3 which senses the signal on line LXH under control of the signal on line BTC. Whenever the transition is from low to high, there is a bit of data which indicates a binary 1. The latch L3 is reset by the tail end of the signal on line BTC whose lead edge serves as a clock for the shift register SR. In particular, the output of the latch L3 is fed to the bit input of the shift register SR while the output of the AND-circuit G2 is fed via line SCK to the clocking input of the shift register SR. It will be noted that the signal on line BTC will only operate the AND-circuit G2 during the presence of the signal on the line ADT.

It will be recalled that each one of the synchronizing signals whether it be the equalizing, horizontal or vertical synchronizing signals, is always prefaced by the preamble which is a four bit "nibble" having the binary value 0001. Thus, in order to determine whether a synchronizing signal is present, this combination is detected in the combination of elements which drive the latch L4. When the binary number 0001 is present, the latch L4 is set, causing the line SNC to go high. This latch will stay set until reset by a signal on line ACS. The signal on line ACS is generated by the re-triggerable delay-flop DF1 which is alerted by the signal on line ADT and is triggered by the signal on line LXH. Thus, as long as there are pulses on the line LXH, the delay flop will stay triggered with the signal ACS high. If there is no pulse signal on the line LXH for approximately one microsecond, the delay flop will reset and the signal ACS will go low. Again, it will be recalled that the equalizing pulse is merely the preamble plus four more bits. Therefore, shortly after the end of preamble, the activity senser or the signal on line ACS will go low, resetting the latch L4 terminating the signal on line SNC. If the preamble were associated with a horizontal synchronizing pulse, the same action would occur; however, following the preamble, there is the H-code of a twelve bit. Therefore, there is loaded into the shift register a sixteen bit word. In addition, the activity lasts for these sixteen bits of time and the signal on line SNC would also last for the same time plus about a 1 microsecond delay at end of activity sensing. Similarly, if the preamble were associated with a vertical synchronizing signal, there is associated with this vertical synchronizing signal code words which are used for switching and other controls with the present invention. Normally, these code words would also be loaded into the shift register and the vertical synchronizing pulse would also be generated by the latch L4 based on the same type of phenomena, i.e., that the latch is set by the preamble and goes off at the end of the coding plus one microsecond. In this way, the conventional synchronizing signals are generated from the preamble and the embedded code.

The input television signal on line VD1 is also fed from the emitter electrode of the amplifier AMP1 through a one microsecond delay line DL1 to the first information input of a conventional video switch VS. The second information input of the video switch VS is the output of the latch L4. The video switch VS during the presence of the signal ACS connects the signal line SNC to the output of the switch. During the absence of the signal ACS, the output of delay line DL1 is connected to line VDO. In this way, a conventional television signal is transmitted on the line VDO. The video portion is received from the delay DL1 while conventional synchronizing pulses are received via line SNC from latch L4. Thus, the television signal on line VDO which is fed to the video tape recorder VTR is no different from any television signal normally received over the air since all coding has been by replaced the conventional synchronizing signals.

It will be recalled that data was loaded into the shift register SR. Actually, the data is loaded in byte increments. Thus, for an H-code there is initially loaded the preamble plus four bits of the H-code; then, this byte is loaded into the memory MEM so that the last eight bits of the H-code can then be fed into the shift register SR. Following their loading therein they are also loaded into another byte position of the memory MEM. The byte positions of the memory MEM are selected based on counts from the bit counter BIC which feeds signals on lines BTG and BTJ to an address decoder ADK which in turn feeds the memory address selector MAS. The actual timing for the loading of the memory centers around the AND-circuits G5 and G6. The loading can only take place while bits are being detected and signals are present on lines BTF and CARYE. The combination of these signals in effect results in a bit count of eight so that the loading takes place in byte units.

At the end of the reception of data, the video signals again occur. At that time, the signal on the line ACS goes low which is used as an indiciation to the control unit CU to transfer the contents of the memory to the control unit (an interrupt signal). The disappearance of the signal on line ACS is also an indication that the subsequent information is purely video.

It should be noted that at the end of the horizontal synchronizing period the conventional television signal includes the color burst oscillations. These color burst oscillations are used to establish the frequency of the oscillator PLO. Therefore, it is necessary to detect these color burst oscillations and feed them to the burst frequency generator BFR. This is accomplished by the delay flop DF2. Thus, when the signal on line ACS goes low, the delay flop DF2 is set for two microseconds generating the signal on line BFG which opens the burst frequency generator BFR to allow the color burst oscillations into the burst frequency regenerator BFR. In addition the termination of the signal on line ACS operating through AND-circuit G5 resets the latch L2 terminating the ADT signal so that in effect no spurious data can enter the shift register SR.

Finally, the trailing edge of the signal on line ACS clears the shift SR and triggers delay flop DF3 which passes a pulse through each of the OR-circuits B3, B4 and B5 to load an end of message (EOM) code into the memory.

Figure 5:
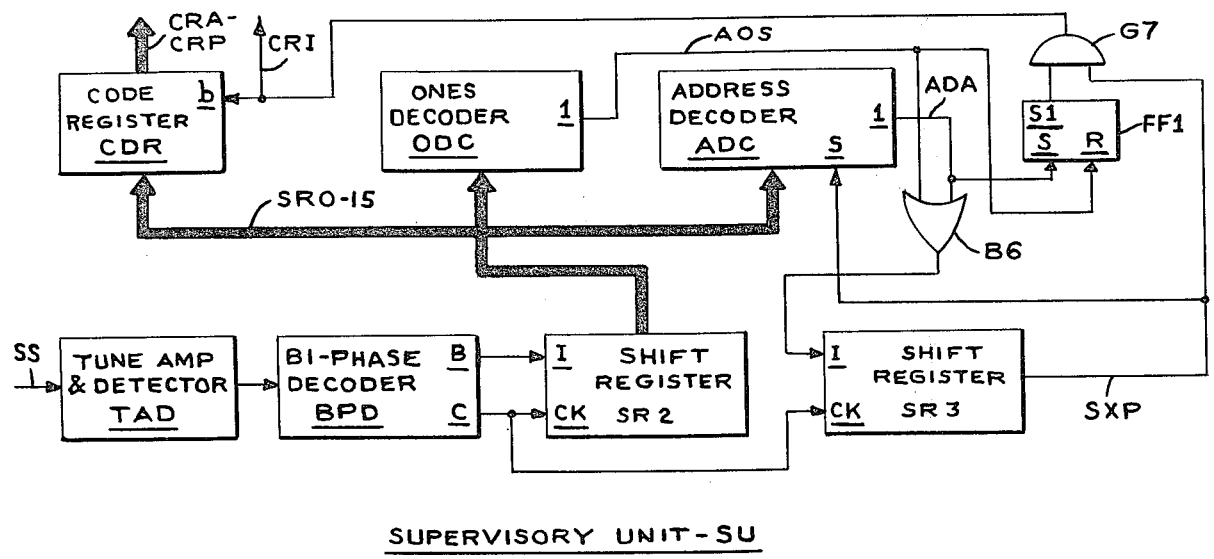
FIG. 5 is a logic diagram of the supervisory unit of FIG. 1.

In FIG. 5 there is shown the supervisory unit SU which receives the P-code and H-code on the line SS from the cable MCC and after converting these codes from biphase coding to straight digital coding feeds the codes via the lines of cable CRA-CRP to the control unit CU along with an interrupt signal on the line CRI. For synchronizing reasons the information on the line SS has the format of sixteen zeros followed by sixteen ones then a sixteen bit address code for the particular terminal then a sixteen bit E-code or a sixteen bit P-code. The first sixteen zeroes basically are used for bit synchronization, whereas the next sixteen bit ones are used to arrive at word synchronization. The sixteen bit address code is used to select the supervisory unit of and the sixteen bit P- or E-codes have their usual function. In operation the data stream in biphase coding is received by the tuned amplifier and dectector TAD for amplification and detection. The signals are then fed to the biphase decoder BPD which emits from its C-output a bit pulse for each bit received and from its B-output transmits a pulse for each "one" bit it receives. The pulses from the C-output are the shift pulses for the shift registers SR2 and SR3. The I-input of the shift register SR2 receives the bit information from the decoder BPD. The contents of the shift register are fed in parallel to the lines of the cable SRO-15. Whenever there are sixteen bits in the sixteen stages of the shift register SR2 the one decoder ODC recognizes this fact and emits a pulse on the line AOS connected to one input of the OR-circuit B6 and also to the reset input of the flipflop FF1. The output of the OR-circuit B6 is fed to the increment input or I-input of the shift register SR3 whereby the first position of the shift register SR3 acting as a counting register is loaded. At the end of sixteen more clock pulses the shift register SR3 will emit a pulse on line SXP. This pulse is fed to the strobe input of the address decoder ADC. If at that time the shift register SR2 contains the address of the particular terminal as indicated by the hard wiring of the decoder ADC said decoder will emit a pulse on the line ADA.

This pulse passes through the OR-circuit B6 to start another sixteen bit counting cycle. In addition it sets the flipflop FF1 enabling the AND-circuit G7. At this time it is known that the following sixteen bits will be either an E-code or a P-code for the particular terminal. When these sixteen bits are loaded into the shift register SR2 they are presented to the code register CDR which is a set of sixteen latches. At the end of the sixteen count the shift register SR3 emits another pulse on line SXP which passes through AND-circuit G7 to become a signal on line CRI which is fed to the control unit CU as an interrupt signal. In addition this signal is fed to the strobe terminal of the code register CDR to load the sixteen bit code therein. This sixteen bit code whether it be an E-code or an D-code is fed in parallel on the lines of the cable CRA-CRP. The indication as to whether the code is an E-code or a P-code is determined by the least significant bit of the code.

The television unit TU can be a conventional television receiver whose antenna terminals are connected to the conventional video output terminals of the video tape-recorder VTR via lines RTV. It is also possible instead of using conventional television receivers to use merely television monitors and rely on the video tape recorder to supply the synchronizing signals.

Figure 6:
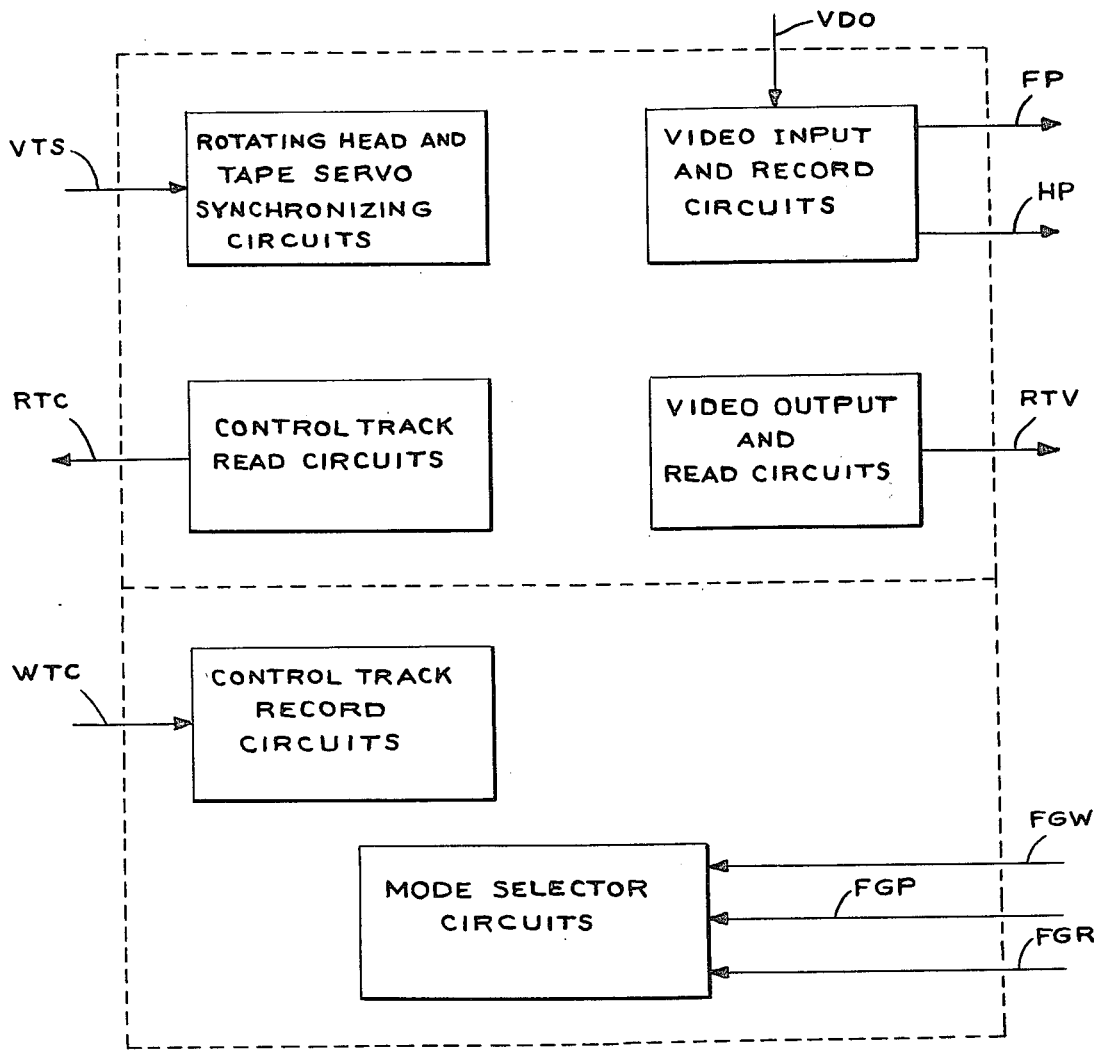
FIG. 6 is a block diagram of the video tape recorder of FIG. 1.

The block diagram of the video tape recorder VPI is shown in FIG. 6. Any conventional video tape recorder can be used. For the sake of definiteness there has been used a Mitsubishi Model HS300U. This tape recorder has the conventional tape moving means and the recording and reproducing heads includes rotating head and tape servo-drive synchronizing circuits. These are basically circuits which synchronize tape movement and rotating head rotation to assure the proper recording and reproduction of the signals. For the present invention the line VTS from the control unit supplies the synchronizing signal. The taperecorder also includes control track read circuit and control track write circuits which are normally connected to the read-write head of the longitudinal track for the control signals. The outputs of the read circuits are connected to the line RTS and the input to the record circuits are connected to the line WTC. The tape recorder also includes video input and record circuits. These are the circuits used for taking the video signals and recording them on the tape. In addition these circuits include means for separating out the frame pulses and the horizontal sync pulses. Thus, the video input and record circuits receive the signals on the line VDO and feed the frame pulses and horizontal pulses are connected or fed via the lines FP and HP respectively to the control unit. There are also video output and read circuits which during playback are connected to the rotating head to pick up the video signals. The output of these circuits is connected to the line RTV. In addition the tape recorder includes mode selector circuits which control it to read, write or pause. The signals and lines FGR, FGW and FGP activate these circuits.

Figure 7:
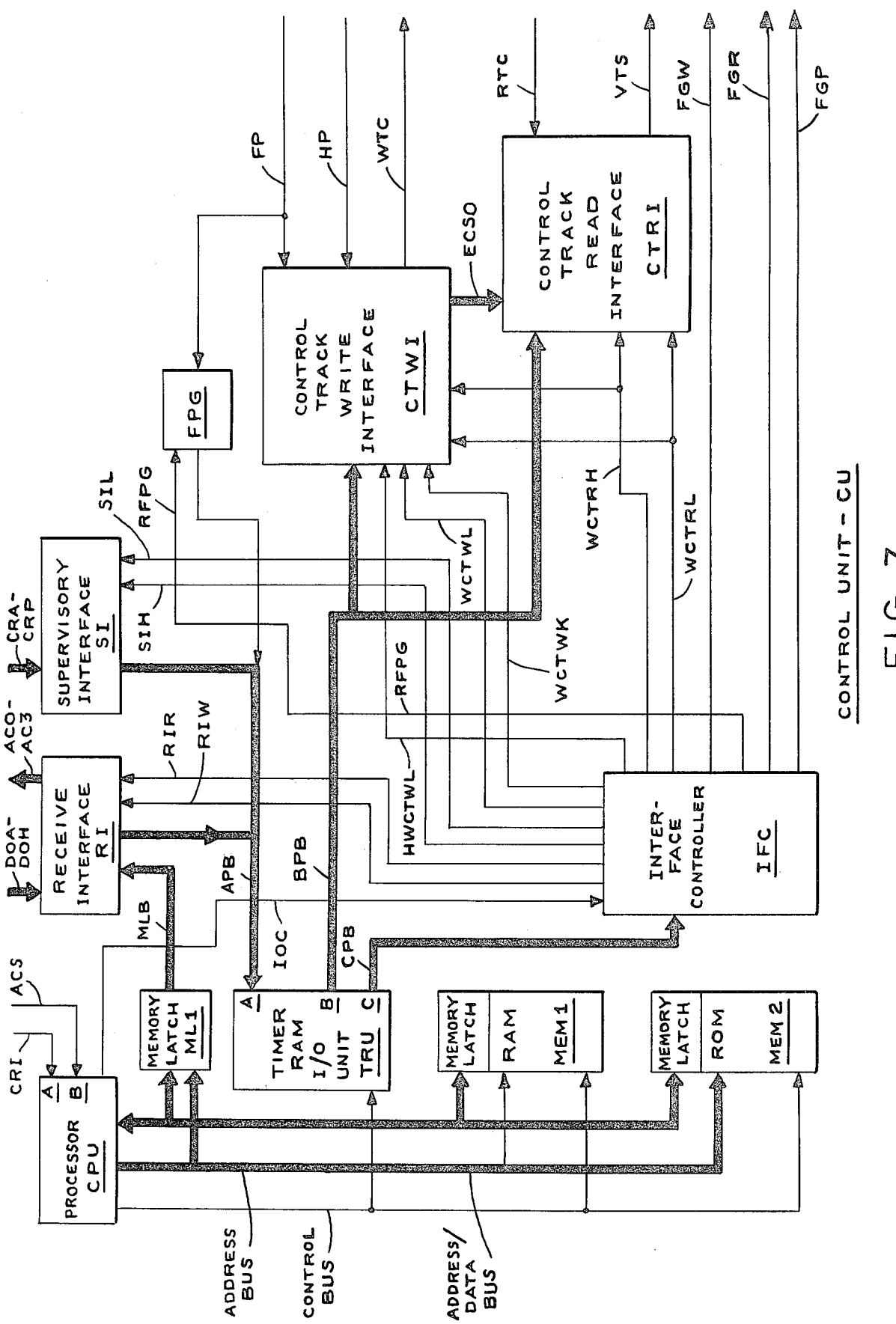
FIG. 7 is a block diagram of the control unit of FIG. 1.

In FIG. 7 (the control unit CU) centers around a computer comprising a processor CPU a timer-I/O unit TRU, a random access memory unit MEM1 and a read-only memory unit MEM2. The units are connected in a conventional manner to a bus system. The bus includes a control bus, an address bus and an address/data bus. The processor CPU can be of the type 8085 having a plurality of interrupt ports such as A and B, output control ports connected to the control bus, output address ports connected to the address bus and hybrid ports for either emitting addresses or data onto the address/data bus. Generally associated with the type 8085, processor is a type 8155 device. This device includes the timer for the system, a small amount of random access memory, and three bidirectional I/O facilities. Memory for the system is provided by a random access memory and a suitable one can be the type 2114. In addition, the programming for the system requires a read-only memory and a suitable type can be the 2716. The processor, the hybrid unit and both memories along with the bus system provide programmable control for the unit. Also associated with the unit is a receive interface RI which basically comprises two sets of gated amplifiers such that for one set of eight such amplifiers upon receipt of a signal on line RIR information can flow from the bus DOA-DOH to the bus APB and when a signal is received from line RIW the other set of amplifiers is activated so that data can flow from the bus MLB to the bus ADO-AD3. The control unit CU also includes a supervisory interface SI which connects the bus CRA-CRP to the bus APB. However it should be realized that first mentioned bus is a two-byte wide bus and the second mentioned bus is a single byte wide bus. Therefore the eight lower significant bits are transferable in response to a signal on the line SIL whereas the eight more significant bits transferable in response to a signal on the line SIH. There is also a control track with interface CTWI which essentially receives the E-code, the P-code and the H-code from the unit TRU in response to a signal on one of the lines from the interface controller IFC. Thereafter it will generate the signals for writing on the control track under the timing of signals received from the video tape recorder via the lines FP and HP. The signals written on the control track are again biphase coded-signals representing the H-code and the P-code. These signals are fed to the control track of the video tape recorder VTR via the line WTC. The control track read interface receives the E-code from the unit TRU in response to signals on lines WCTRH and WCTRL and thereafter during the playback when it receives the H-codes and the P-codes from the video tape recorder on the line RTC it generates the synchronizing signals on the like VTS for synchronizing the magnetic tape and the rotating magnetic head of the tape recorder.

The interface controller IFC receives on the bus CPB from the unit TRU signals indicating which of the interfaces is to operate and what its particular mode of operation is. In addition the interface controller will emit signals on the lines FGW, FGR and FGP to the video tape recorder. In essence the interface controller IFC is merely a decoder which receives a single byte and decodes it into a signal on one of its output lines to do the controlling.

In operation whenever there is a signal present on the line CRI the A interrupt of the processor CPU is energized. In response thereto the processor causes the system and particularly the I/O unit TRU to emit a control byte on the bus CPB to the interface controller IFC. The interface controller IFC in response thereto emits a signal on the line SIL causing the supervisory interface SI to feed the eight lower bits of a code onto the bus APB which is connected to the A-port of the I/O unit TRU. Following this the processor causes the system to emit a second control byte on the bus CPB to the interface controller IFC. The controller in response thereto sends a signal on the line SIH to the supervisory interface SI. Supervisory interface SI now transmits the eight more significant bytes of the code to the I/O unit TRU. In this way the code is entered into the processor system.

The processor system now looks at this code to determine whether it is an E-code or a P-code. If it is an E-code the system emits a control byte on the bus CPB and in response thereto the interface controller IFC emits a control signal on the lines WCTRL. At the same time the I/O unit TRU transmit the eight lesser significant bits of the code to the control track write interface CTWI and the control track read interface CTRI and these bits are loaded into the interfaces. Then the unit TRU emits another control byte to the interface controller which now emits a signal on the line WCTRH and at the same time the I/O unit TRU feeds the eight more significant byte to these interfaces for loading therein. If the code had been a P-code the processing system would feed a control byte to the interface controller IFC which would now emit a signal on line PWCTWL to the control track write interface while at the same time feeding the eight least significant bits via the bus BPB to that interface. This would be followed by a signal on the line WCTWH and the more significant byte would then be transmitted. Similarly as well hereinafter become apparent the H-codes are loaded into the control track wrtie interface by means of signals on lines HWCTWL and HWCTWH.

Whenever the signal on line ACS drops, the B- port of the processor CPU is energized and a loading routine of the contents of the receive unit is initiated. In particular the processor CPU transfers to the memory latch ML1 an address byte on the bus MLB and also transmits from the I/O unit TRU via its port C- a control byte fed to the interface IFC. The interface controller in response thereto emits a signal on the line RIW causing the address byte to be fed via the cable AD0-AD3 to the receive unit. Receive unit in response thereto will send back a byte on the cable DOA-DOH. The processor then causes a control byte to be fed to the interface control IFC which in response thereto now generates a signal on the line RIR causing the receive interface RI to transmit the byte on the cable DOA-DOH to the bus APB and this byte is loaded into the I/O unit TRU. In this way the information in the receive unit is loaded into the central processor. (It will be recalled that the key information coming from the receive unit would be the H-code). In any event, bytes are loaded into the processor system and the loading will continue until a byte is received indicating the end of massage. When the processor CPU senses this EOM byte it terminates the loading routine. As each H-code is received, the processor starts a routine for transferring this code to the control track write interface CTWI.

Whenever the video tape recorder VTI is to be controlled whether it is to read, write or pause the processor CPU causes the I/O unit TRU to emit a control byte on the cable CPB to the interface controller IFC. This controller then decodes that byte to emit a signal on one of the lines FGW, FGR or FGP.

Figure 8:
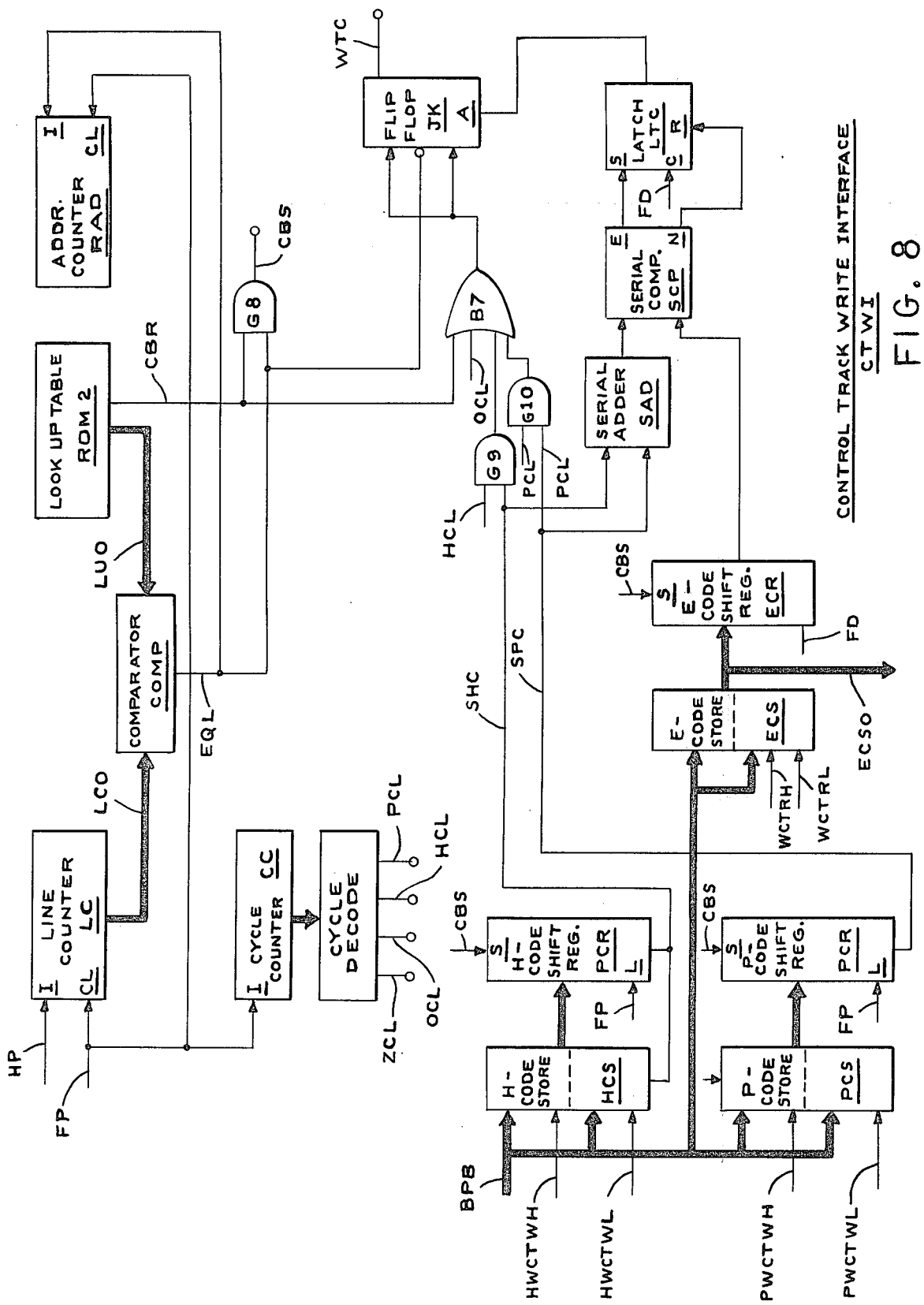
FIG. 8 is a logic diagram of the control track write interface of FIG. 7.

In FIG. 8 there is shown the control track write interface CTWI. The function of this interface is to record the control track on the video tape recorder. The control track has written thereon along its length the combinations of sixteen zero bits, sixteen one bits, the sixteen bit H-code followed by the sixteen bit P-code. These sixteen bit words are uniformly distributed along the control track and basically in synchronism with the frame pulses, that is the occurrence of a frame pulse will result in the recording of one of these sixteen bit words. In addition the sixteen bits of the word are uniformly distributed along the track. In order to determine the uniform distribution there is utilized the fact that there are a fixed number (525) lines between pairs of frame pulses. Therefore in effect this 525 line count is divided into sixteen approximately equal parts and each part is considered to be a bit cell. Furthermore, because of the fact that the recording is of the biphase type wherein the indication of a one is the transition in the recording level at the center of the bit cell. The counting of the horizontal lines is also used to determine where the transition points must occur. In Table I which follows there is shown the division of the horizontal line counts for the bit cells and the transition points.

TABLE I

TELEVISION LINE COUNT TO DETERMINE BIT FORMAT

| Bit No. | End of Cell | Ones Transition |
|---|---|---|
| 0 | 33 | 17 |
| 1 | 65 | 49 |
| 2 | 97 | 81 |
| 3 | 131 | 114 |
| 4 | 165 | 148 |
| 5 | 197 | 181 |
| 6 | 229 | 213 |
| 7 | 261 | 245 |
| 8 | 295 | 278 |
| 9 | 329 | 312 |
| 10 | 361 | 345 |
| 11 | 395 | 378 |
| 12 | 427 | 411 |
| 13 | 461 | 444 |
| 14 | 493 | 477 |
| 15 | 525 | 509 |

In FIG. 8 there is shown a cycle counter CC incremented by the frame pulses on the line FP, that is, each time a frame pulse is received on the line FP the cycle counter is incremented by one. Since the cycle counter will be a modulo-four counter it will count to four and recycle. The outputs of the cycle counter C-C are fed to a cycle decoder CD which, say, for a count of zero will raise the level on the line ZCL, for a count of two will raise the voltage on the line HCL, for a count of three raises the line PCL. In this way the four sets of sixteen bit words will be demarcated.

The cell locating is accomplished by the circuitry centered around the comparator COMP. One input of the comparator COMP is fed by the line counter LC. The line counter is initially cleared to zero at the occurrence of each frame pulse and is unit incremented for each one of the horizontal lines as indicated by a signal on line HP. The other input of the comparator COMP which is a parallel comparator receives signals on the cable LUO from the look up table ROM2. Stored in the look up table ROM2 are the values shown in Table I. These values are stored in sequential addresses in the same way shown in Table I, however it should be noted in the first address there is shown the ones transition for bit number zero, in the second address the end of the cell for bit number zero, in the third address the ones transition for the bit number one, in the fourth address the end of cell position of bit number one, etc. The look up table ROM2 is addresses by the address counter RAD which again is initially cleared at each of the frame pulses and is incremented whenever the comparator emits a pulse on line EQL indicating an equality. In addition it should be noted that the least significant bit position of the look up table output is fed separately to an input of the AND-circuit G8. There will be a signal in this position whenever the number being read from the look up table is associated with a cell boundary and there will be no signal in this position whenever the number being presented by the look up table is a ones transition position. Thus, the signal on the line CBR will alert the AND-circuit G8 and when the equality is reached a signal will be emitted on the line CBS indicating the end of a cell boundary. The actual writing of the biphase codes is performed by flipflop JK whose output is connected to the line WTC. For the minute it will be assumed that the flipflop is allowed, that is, its allow input A is activated. In such case at the end of every cell boundary there should be a transition in the recording. Thus bus line CBR is connected to one input of the OR-circuit B7. Hence for every equality associated with a cell boundary the flipflop JK changes state. Since during the zero cycle there is no further control on the flipflop there will be recorded the sixteen transitions associated with cell boundaries which is equivalent to the writing of sixteen zeroes. During the next cycle when the sixteen ones are recorded the signal OCL from the cycle decoder is fed as a second input to the OR-circuit B7. Accordingly, for every equality there will be a reversal of the flipflop JK. In this manner the sixteen ones are recorded. The recording of the H-code is controlled by the AND-circuit G9 having one of its inputs receiving the signal on line HCL and on the other of its inputs receiving a signal on line SHC.

The actual H-codes are received on the bus BPB from the I/O unit TRU. Eight bits of the H-code are on the bus at one time and are gated into eight positions of the H-code store HCS in response to a signal on line HWCTWL and then the second eight bits are entered into the upper eight positions of the store in response to a signal on line HWCTWH. After the H-code is stored therein each frame pulse that is received on the line FP transfers the contents of the H-code store HCS into the H-code shift register HCR. The sixteen bits stored in the shift register are sequentially shifted out in response to the pulses on the line CBS feeding the shift input of the register. The output of the register is connected to the line SHC.

The writing of the P-codes is controlled by the AND-circuit G10 having one input connected to the line PCL which is only active during the writing of the P-codes. The actual P-code is received on line SPC. In the same manner that the H-codes are handled by the H-code store HCS and the H-code shift register HCR there is also provided a P-code store PCS and a P-code shift register PCR. It should be noted that the loading of the P-code store is under control of the signals on lines PWCTWL and PWCTWH.

However, it should be realized that the writing cannot occur unless a check is performed, that is, to make sure that the subscriber is, say, current in his billing. It will be recalled that the check uses a certain routine such that the sum of the H-code and the P-code equal the the E-code. If this is so then the recording is permitted. First of all the E-code is loaded into the interface from the bus BPB under the control of the signals WCTRH and WCTRL in the same manner as concerning the P- and the H-codes. On the occurrence of a frame pulse on line FP the E-code is transferred in parallel into the E-code shift register ECR. Thereafter, it is sequentially shifted out of the shift register. At the same time this is occurring the H- and the P-codes are being sequentially shifted out of their shift registers into the serial adder SAD. The serial sum bits are fed to one input of a serial comparator whose other input receives the E-code bits in series. If an equality exists the E-output of the serial comparator sets the latch LTC whose output is fed to the allow input A of the flipflop JK. Whenever there is not an equality the N-output of the comparator emits a pulse and this resets the latch terminating the allow signal. (It should also be noted that at the start of a frame the frame pulse again initializes the state of the latch.)

Figure 9:
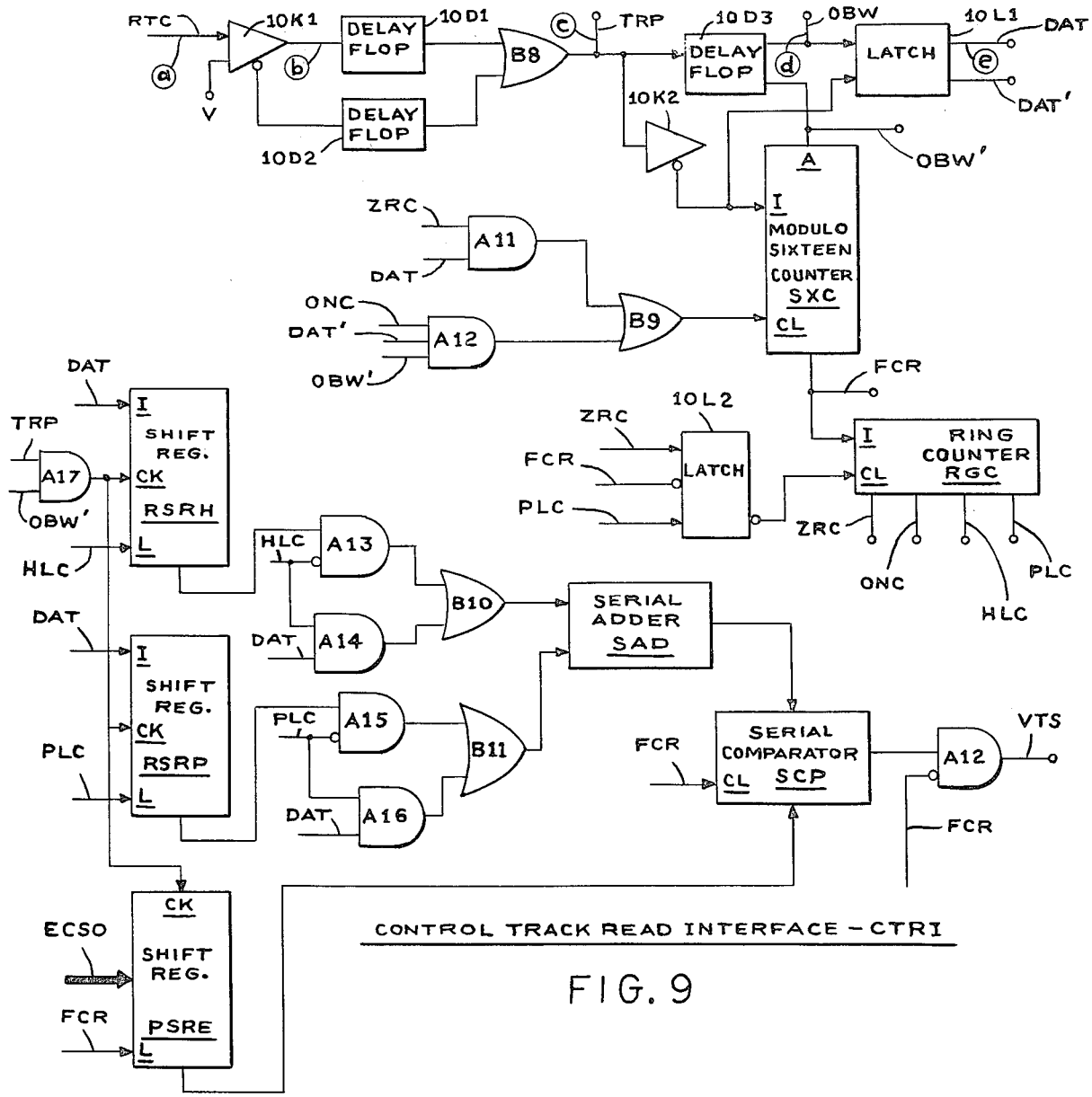
FIG. 9 is a logic diagram of the control track read interface of FIG. 7.
Figure 10:
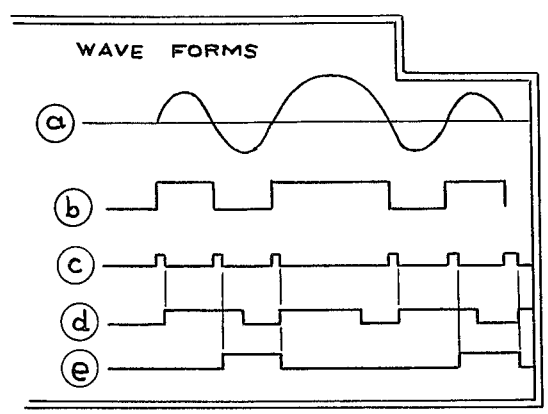
FIG. 10 are waveforms useful in explaining the operation of the interface of FIG. 9.

In FIG. 9 there is shown the control track read interface CTRI. The first portion of the interface extracts the H- and P-codes from the control track signal received on the line RTC. In effect, this portion extracts the serial data as well as counting the sixteen bit cells between pairs of frame pulses. The operation of this portion of the interface will now be described with the aid of the waveforms of FIG. 10. The input waveform from the video tape recorder is received on the line RTC in the form shown in waveform a. This signal is zero-cross clipped by the clipping amplifier 10K1 whose positive output yields the waveform b. The positive output of the amplifier 10K1 is fed to the delay flop 10D1 while the negative output of the amplifier is fed to the delay flop 10D2. The delay flop 10D1 in response to each positive going transition of the signal waveform b emits a narrow pulse to an input of the OR-circuit B8. Similarly, the delay flop 10D2 emits a narrow pulse in effect for every negative going transition of the waveform b. These narrow positive and negative pulses actually define the edges of the waveform b and are fed via the OR-circuit B8 to become the signal on line TRP (waveform C). The outputs of the OR-circuit B8 also feeds the input of the delay flop 10D3. The time of operation of the delay flop is chosen to be roughly ¾ of the time of a bit cell. In the present case since the frame pulses are 33 milliseconds apart and there are sixteen bit cells between frame pulses a suitable time for the delay flop is 1½ milliseconds. Thus the output of the delay flop 10D3 can be considered as "the ones-bit window". This signal on line OBW is fed to the D-input of the latch 10L1. Thus the latch is alerted each bit cell time and if there is a transition in middle of the bit cell as indicated by a pulse from inverting amplifier 10K2 the latch will set and there will be a pulse on the line DAT (waveform e). In this way the ones bits are detected. (It should be noted that the delay flop 10D3 is triggered on by the trailing edge of a pulse on line PRP. See the relationships between waveforms c and d).

In order to establish the word or cycle synchronization there is used the combination of a modulo-sixteen counter SXC and a 4 bit ring counter RGC with modulo-sixteen counter driving the ring counter. The modulo-sixteen counter will effectively establish the sixteen bits per code and the ring counter will essentially establish the cycle of sixteen zeros, the cycle of sixteen ones, the sixteen bit H-code and the sixteen bit P-code by generating signals on the line ZRC, ONC, HLC and PLC respectively. In operation the modulo sixteen counter SC counts the pulses on the line TRP occurring at the beginning of each bit period. This is accomplished by connecting the output of amplifier 10K2 to the incrementing input of the modulo-sixteen counter and by connecting the negative output of the delay flop 10D3 to the allow input of the counter. Accordingly, only the transition pulses at the beginning of the bit cell are counted. In order to establish the proper phasing of the counting the counter is always cleared to zero whenever a one is present during the zero cycle. This clearing is accomplished by the AND-circuit A11 which receives signals on the lines ZRC and DAT. The output of this circuit is fed via the OR-circuit B9 to the CL-input of counter SXZ to again clear it to zero. Also, the counter is cleared to zero whenever a zero is sensed during the ones cycle. This is accomplished by the AND-circuit A12 having inputs connected to the lines ONC, DAT' and OBW'.

Whenever the modulo-sixteen counter reaches a count of sixteen it emits a pulse on line FCR. Thus the counter will emit a pulse on line FCR whenever sixteen zeros are read during the zero cycle or sixteen ones are read during the ones cycle or sixteen bit cells are detected during the H- and P-cycles. The line FCR is fed to the stepping input of the ring counter RGC. The counter steps one position for each signal received from the line FCR at its I-input. The CL-input of the ring counter when it receives a signal clears the counter back to the zero cycle. This input is connected to the negative output of the latch 10L2 whose ones input is connected to the line ZRC and whose zeros input is connected to the line PLC. The clocking input is connected to the line FCR. The latch is set during the zero cycle and released thereafter to insure it starts in the proper position. Similarly, at the end of the P-cycle the latch is again stepped to the zero cycle purely as a matter of insurance.

The remainder of the interface centers around the generation of the reconstituted synchronizing pulses fed on the line VTS to the video tape recorder. It will be recalled that the routine for generating a synchronizing pulse is that the sum of H-code and the P-code equals the E-code. The sum is compared with the E-code by the serial comparator SCP which will receive a serial sum from the serial adder SAD and will receive the E-code from the shift register PSRE. The comparator SCP is cleared at the trailing edge of each signal on line FRC and its output is sampled by the AND-circuit A12 utilizing at the leading edge of the pulse on the line FRC. The shift register PSRE is a non-recirculating type parallel input shift register which is loaded by a signal on FRC fed to the L-input thereof, the loading being from the cable ECSO which carries the E-code from the write interface CPWI. The shift register is fed by signals at its CK-input from a circuit A17 which effectively emits a pulse each bit cell time.

The serial adder SAD adds the H-codes and the P-codes. The H-code is loaded into the shift register RSRH which is of the recirculating type. It is loaded during the H-cycle when a signal HLC is present at its L-input. The loading being the bits received on the line DAT. Clocking, again, is performed by the output of the AND-circuit A17. Similarly, the shift register RSRP receives and P-codes during the presence of a signal on line PLC connected to its L-input. The H-code being then present on the line DAT which is fed to the I-input of this shift register. The clocking is performed again by the output of the AND-circuit A17, the shift register RSRP is also a recirculating shift register. The output of the shift register RSRH is fed to one input of AND-circuit A13 whose other input and inhibiting input receives the signal HLC. Similarly, the output of the shift register RSRP is connected to one input of the AND-circuit A15 whose other (inhibiting) input receives the signal on line PLC. The signal line PLC is also connected to one input of the AND-circuit A16 whose other input is connected to the line DAT. The outputs of the AND-circuits A15 and A16 feed inputs of the OR circuit A11 whose output is connected to the one input of the serial adder SAD. Similarly, the line HLC is connected to one input of the line A14 its other input is connected to the line DAT. The outputs of the AND-circuits A13 and A14 feed inputs of the OR-circuit B10 whose output is connected to the other input of the serial adder SAD. Thus, during an H-cycle when the shift register is RSRH is being loaded, the loaded data is also being fed to the serial adder via the AND-circuit A14 and the OR-circuit B10. At that time, also, the contents of the shift register RSRP (P-code) are passing through the AND-circuit A15 and the OR-circuit A11 to the other input of the adder and the sums are formed. Similarly, during the loading of the P-code into the shift register RSRP, the P-codes are also fed via the AND-circuit A16 and the OR-circuit B11 to one input of the serial adder SAD while the contents of the shift register RSRH (H-code) are fed via the AND-circuit A13 and the OR-circuit B10 to the other input of the serial adder. At the same time, the formed sums are being compared to the contents of the shift register PSRE (E-code). The output of the comparator SCP is sampled by AND-circuit A17 by the signal of line FCR to generate the sync signal fed to the video tape recorder on line VTS.

There will now be discussed another aspect of the invention which is concerned with the ability to be able to continuously display a single frame received from the head end unit HEU. Normally, this feature would be concerned with catalog shopping or the like. When a user decides that he would like to continuously view a single frame of information, he would signal the head end unit of this fact. The head end unit HEU in response thereto during the course of the transmission would transmit to all terminals the particular frame but with the frame there would be included the address of the terminal requesting the particular frame. For instance, in a Teletext system wherein users select their viewing material, the particular terminal would utilize this facility for selecting the frame. Since the signalling to select the frame and the actual selection of the frame by the head end unit do not constitute part of the present invention, this will not be further discussed. Therefore, it will be assumed that the head end unit HEU does transmit the desired frame and includes in the signals associated with the vertical blanking interval the address of the requesting subscriber terminal. Just prior to this request, the user sets the video tape recorder to both the pause and the record modes, i.e., such that the video tape recorder continuously records the incoming video information on the same portion of the tape. When the terminal receives the signals associated with the vertical blanking interval which leads the desired frame, these signals are processed in the usual manner. In particular, in FIG. 7 the control unit CU receives the address from the receive unit RU via the receive interface RI. This address at this time is loaded via the I/O unit TRU into the processor CPU. The processor CPU goes through a sub-routine wherein the address it just received is compared against the address of the terminal and if there is a match, the processor CPU records this fact. In effect, the processor CPU realizes that the frame now coming up is the frame desired by the terminal. The processor CPU then emits a control byte on the bus CPB to the interface controller IFC. The interface controller IFC in response thereto emits a signal onto the line RFPG to the frame pulse gate FPG alerting this gate. With this gate alerted, when the next frame pulse is read it passes through the gate PFG onto the bus APB into the I/O unit TRU. From there, the pulse is passed to the processor CPU to indicate that the end of the desired frame has been reached. The processor CPU in response thereto sends another control byte from the I/O unit TRU via the bus CPB to the interface controller IFC. The interface controller IFC in response thereto terminates the signal on the line FGW and initiates the signal on the line FGR. Thus, the video cassette recorder is switched from the write to the read mode with the pause still in effect so that there is now continuously displayed the desired frame. This frame will be displayed until the user cancels it by signalling the control unit CU that the pause is to be terminated.

While only one embodiment of the invention has been shown and described in detail, there will now be obvious to those skilled in the art many modifications and variations satisfying many or all of the objects of the invention without departing from the spirit thereof as defined in the appended claims.

What is claimed is:

1. In a video recorder having a first transducer which moves with respect to a moving record medium to selectively record and play back video information, the record medium having a control region which is accessed for recording or playback by a second transducer wherein during playback signals recorded on the control region are utilized for synchronizing the relative movement between the first transducer and the second transducer and the record medium, the improvement comprising storing means external of said record medium for storing first coded indicia, and generating means responsive to said storing means and connected to the second transducer for generating second coded indicia to be recorded in the control region simultaneously with the recording of video information by the first transducer, provided the second coded indicia has a predetermined relationship with the stored first coded indicia.

2. In a video recorder having a first transducer which moves with respect to a moving record medium to selectively record and play back video information, the record medium having a control region accessed for recording or playback by a second transducer and having synchronizing circuits responsive to synchronizing signals for synchronizing the relative movement between the first transducer and the record medium, the improvement comprising storing means external of the record medium for storing first coded indicia, generating means connected to the second transducer for generating second coded indicia to be recorded in the control region simultaneously with the recording of video information by the first transducer, and synchronizing signal generating means connected to the synchronizing circuit for generating the synchronizing signals during the playback of video information by the first transducer only when the second coded indicia played back by the second transducer has a predetermined relationship with the stored first coded indicia.

3. In a television system including a head end unit which transmits control indicia as well as television signals including both video information and synchronizing information, a common cable connecting the head end unit to a plurality of video terminals, each of the video terminals including a video tape recorder having a rotating magnetic head which rotates past a longitudinally moving magnetic tape to selectively record and play back television signals, the tape having a longitudinal control track which is accessed for recording and playback by a fixed magnetic head and having synchronizing circuits responsive to synchronizing signals for synchronizing the rotation of the rotating magnetic head with the longitudinal movement of the tape, the improvement comprising storing means in each video terminal for storing first coded signals in response to first control indicia received from the head end unit and unique to the particular video terminal, first generating means in each video terminal and connected to the fixed magnetic head of the associated video tape recorder for generating, in response to video control indicia embedded in and unique to the particular television signals being transmitted, second coded signals for recording on the longitudinal control track simultaneously with the recording of such television signals by the rotating magnetic head, second generating means in each video terminal and connected to the fixed magnetic head of the associated video tape recorder for generating third coded signals for recording on the longitudinal control track in response to further control indicia received from the head end unit and functionally related to both said first control indicia and said video control indicia, and synchronizing signal generating means in each video terminal connected to the synchronizing circuit of the associated video tape recorder for generating the synchronizing signals during the playback of television signals by the rotating magnetic head only when the coded signals played back by the fixed magnetic head have a predetermined relationship with the stored coded signals.

4. In a television system including a head end unit which transmits control indicia as well as television signals including both video information and synchronizing information, a common cable connecting the head end unit to a plurality of video terminals, each of the video terminals including a video tape recorder having a rotating magnetic head which rotates past a longitudinally moving magnetic tape to selectively record and play back television signals, the tape having a longitudinal control track which is accessed for recording and playback by a fixed magnetic head and having synchronizing circuits responsive to synchronizing signals for synchronizing the rotation of the rotating magnetic head with the longitudinal movement of the tape, the improvement comprising storing means in each video terminal for storing first coded signals in response to first control indicia received from the head end unit and unique to the particular video terminal, and first generating means in each video terminal and connected to the fixed magnetic head of the associated video tape recorder for generating, in response to video control indicia embedded in and unique to the particular television signals being transmitted, synchronizing signals to be recorded on the longitudinal control track simultaneously with the recording of such television signals by the rotating magnetic head, said synchronizing signals being utilized by the synchronizing circuits of the video tape recorder during playback.

5. In a television system including a head end unit which transmits control indicia as well as television signals including both video information and synchronizing information, a common cable connecting the head end unit to a plurality of video terminals, each of the video terminals include a video tape recorder having a rotating magnetic head which rotates transversely past a longitudinally moving magnetic tape to selectively record and play back television signals, the tape having a longitudinal control track which is accessed for recording and playback by a fixed magnetic head and having synchronizing circuits responsive to synchronizing signals for synchronizing the rotation of the rotating magnetic head with the longitudinal movement of the tape, the improvement comprising storing means in each video terminal for storing first coded signals in response to first control indicia received from the head end unit and unique to the particular video terminal, first generating means in each video terminal for generating, in response to video control indicia embedded in and unique to the particular television signals being transmitted, second coded signals, second generating means in each video terminal for generating third coded signals, and means connected to the fixed magnetic head for recording said second and third coded signals generated by said first and second generating means only when a particular relationship exists among the first, second and third coded signals.

6. The apparatus of claim 5 further comprising synchronizing signal generating means in each video terminal connected to the synchronizing circuit of the associated video tape recorder for generating the synchronizing signals during the playback of television signals by the rotating magnetic head only when the coded signals played back by the fixed magnetic head have a predetermined relationship with the stored coded signals.

7. The television system of claim 5 or 6 wherein the common cable has a plurality of television channels for transferring different video programs on different channels and at least one control indicia channel, said first and further control indicia being transmitted from the head end unit to the control indicia channel including address information for the particular video terminal, said video control indicia being transmitted in association with the synchronizing information, and each video terminal including address decoding means for controlling the reception of said first and further control indicia.

8. The television system of claim 7 wherein the television signal synchronizing information includes equalizing, horizontal synchronizing, vertical synchronizing and color burst information, said video control indicia being transmitted in association with said horizontal synchronizing information.

9. The television system of claim 8 wherein each video terminal includes means operative in response to the presence of the horizontal synchronizing information for removing the video control indicia from the television signal and converting such indicia to said second control signals.

10. The television system of claim 8 wherein said equalizing, horizontal synchronizing and vertical synchronizing information and said video control indicia are biphase binary coded words and each of said video terminals includes means for converting such biphase binary coded words to equalizing, horizontal synchronizing and vertical synchronizing pulses for transmission to the associated rotating magnetic head.

* * * * *